(12) United States Patent
Yang et al.

(10) Patent No.: US 11,480,967 B2
(45) Date of Patent: Oct. 25, 2022

(54) PASS ROUTE PLANNING METHOD AND APPARATUS, DEVICE AND READABLE STORAGE MEDIUM

(71) Applicant: BEIJING BAIDU NETCOM SCIENCE TECHNOLOGY CO., LTD., Beijing (CN)

(72) Inventors: Fan Yang, Beijing (CN); Fan Zhu, Beijing (CN); Weicheng Zhu, Beijing (CN); Leibing Lv, Beijing (CN); Lin Ma, Beijing (CN); Ning Yu, Beijing (CN); Bei Liu, Beijing (CN)

( * ) Notice: Subject to any disclaimer, the term of this patent is extended or adjusted under 35 U.S.C. 154(b) by 219 days.

(21) Appl. No.: 16/703,999

(22) Filed: Dec. 5, 2019

(65) Prior Publication Data

US 2020/0183401 A1 Jun. 11, 2020

(30) Foreign Application Priority Data

Dec. 5, 2018 (CN) .......................... 201811479922.X (51) Int. Cl.
*G05D 1/02* (2020.01)
*G08G 1/16* (2006.01)
*G05D 1/00* (2006.01)

(52) U.S. Cl.
CPC ......... *G05D 1/0212* (2013.01); *G05D 1/0088* (2013.01); *G08G 1/166* (2013.01); *G05D 2201/0213* (2013.01)

(58) Field of Classification Search
CPC ............... G05D 1/0212; G05D 1/0088; G05D 2201/0213; G08G 1/166

(Continued)

(56) References Cited

U.S. PATENT DOCUMENTS 8,260,485 B1 9/2012 Meuth et al.
9,174,672 B2 * 11/2015 Zeng ................... B60W 30/095

(Continued)

FOREIGN PATENT DOCUMENTS

CN 101077578 A 11/2007
CN 102929286 A 2/2013

(Continued)

OTHER PUBLICATIONS

First Office Action issued in CN Patent Application No. 201811479922.X dated Jul. 22, 2020.

*Primary Examiner* — Yazan A Soofi
(74) *Attorney, Agent, or Firm* — Dilworth IP, LLC (57) ABSTRACT

Provided are a pass route planning method and apparatus, a device and a readable storage medium. The method includes: obtaining current road environment information in front of a vehicle; determining a current passable area according to the current road environment information; setting pass candidate points in the current passable area; and determining a current optimal passable route according to the pass candidate points. Firstly, the passable area is determined, and then the pass candidate points are set in the passable area, and thus the current optimal passable route is calculated according to the pass candidate points in the passable area, which can effectively reduce a calculation amount of unreachable pass routes in the prior art in which candidate points are set in all areas directly in front of an unmanned vehicle, thereby reducing a calculation amount for planning a pass route and improving a planning speed of the pass route.

17 Claims, 5 Drawing Sheets

(58) Field of Classification Search
USPC .......................................................... 701/302
See application file for complete search history.

(56) References Cited

U.S. PATENT DOCUMENTS

| | | | |
|---|---|---|---|
| 10,831,210 B1* | 11/2020 | Kobilarov | B60W 60/0011 |
| 2018/0345963 A1* | 12/2018 | Maura | G05D 1/0223 |
| 2019/0315357 A1* | 10/2019 | Zhang | G05D 1/0238 |
| 2019/0369616 A1* | 12/2019 | Ostafew | B60W 60/0027 |
| 2020/0128277 A1* | 4/2020 | Helle | H04N 19/176 |
| 2020/0142417 A1* | 5/2020 | Hudecek | B60W 30/0953 |
| 2020/0385018 A1* | 12/2020 | Kameoka | B60W 60/0011 |
| 2020/0398894 A1* | 12/2020 | Hudecek | G05D 1/0088 |
| 2021/0108936 A1* | 4/2021 | Seegmiller | G01C 21/3461 |
| 2021/0114617 A1* | 4/2021 | Phillips | B60W 30/0956 |
| 2021/0221367 A1* | 7/2021 | Hiramatsu | B60W 30/09 |

FOREIGN PATENT DOCUMENTS

| | | |
|---|---|---|
| CN | 102963358 A | 3/2013 |
| CN | 103200642 A | 7/2013 |
| CN | 103335658 A | 10/2013 |
| CN | 103528585 A | 1/2014 |
| CN | 104392625 A | 3/2015 |
| CN | 105318888 A | 2/2016 |
| CN | 105549597 A | 5/2016 |
| CN | 106114507 A | 11/2016 |
| CN | 106767866 A | 5/2017 |
| CN | 107215339 A | 9/2017 |
| CN | 107357304 A | 11/2017 |
| CN | 107479561 A | 12/2017 |
| CN | 107491068 A | 12/2017 |
| CN | 107659596 A | 2/2018 |
| CN | 107843267 A | 3/2018 |
| CN | 108445503 A | 8/2018 |
| JP | 2018138404 A | 9/2018 |
| JP | 2018138405 A | 9/2018 |

* cited by examiner

PASS ROUTE PLANNING METHOD AND APPARATUS, DEVICE AND READABLE
STORAGE MEDIUM

CROSS-REFERENCE TO RELATED
APPLICATION

This application claims priority to Chinese Patent Application No. 201811479922.X, filed on Dec. 5, 2018, which is hereby incorporated by reference in its entirety.

TECHNICAL FIELD

Embodiments of the present application relate to the field of unmanned driving technology, and in particular, to a pass route planning method and apparatus, a device and a readable storage medium.

BACKGROUND

With the development of computer technology and artificial intelligence, unmanned driving vehicles (unmanned vehicles for short) have broad application prospects in aspects such as transportation, military, logistics warehousing, daily life and so on Unmanned driving technology mainly includes perception of environmental information, intelligent decision-making of driving behavior, planning of collision-free routes, and motion control of vehicles. Route planning is a key part of unmanned driving technology, and is based on environmental data of a perceptual system. A vehicle needs to plan a safe and reliable, shortest collision-free route from a starting position to a target position based on certain performance indicators in a complex road environment.

An existing pass route planning method is mainly a planning method based on Lattice algorithm, which uniformly sets pass candidate points in all areas directly in front of an unmanned vehicle, where the pass candidate points may be set on a front obstacle, then calculates each pass route, excludes unreachable pass routes that touch obstacles, and selects an optimal pass route from reachable pass routes.

The pass route planning method in the prior art increases unnecessary calculation of unreachable routes, increases a calculation amount for planning a pass route, and reduces a planning speed of the pass route.

SUMMARY

Embodiments of the present application provide a pass route planning method and apparatus, a device and a readable storage medium, which solve the technical problem of the pass route planning method in the prior art, that is, increasing the unnecessary calculation of unreachable routes, increasing the calculation amount for planning the pass route, and reducing the planning speed of the pass route.

A first aspect of the embodiments of the present application provides a pass route planning method, including: obtaining current road environment information in front of a vehicle; determining a current passable area according to the current road environment information; setting pass candidate points in the current passable area; and determining a current optimal passable route according to the pass candidate points.

A second aspect of the embodiments of the present application provides a pass route planning apparatus, including: a road environment data obtaining unit, configured to obtain current road environment information in front of a vehicle; a current passable area determining unit, configured to determine a current passable area according to the current road environment information; a candidate point setting unit, configured to set pass candidate points in the current passable area; and an optimal passable route determining unit, configured to determine a current optimal passable route according to the pass candidate points.

A third aspect of the embodiments of the present application provides an electronic device, including: a memory, a processor and a computer program; where the computer program is stored in the memory and configured to be executed by the processor to implement the method of the first aspect described above.

A fourth aspect of the embodiments of the present application provides a computer readable storage medium with a computer program stored thereon, where the computer program is executed by a processor to implement the method of the first aspect.

Based on the above aspects, the embodiments of the present application obtain current road environment information in front of a vehicle, determine a current passable area according to the current road environment information, set pass candidate points in the current passable area, and determine a current optimal passable route according to the pass candidate points. Firstly, the passable area is determined, and then the pass candidate points are set in the passable area, and thus the current optimal passable route is calculated according to the pass candidate points in the passable area, which can effectively reduce a calculation amount of the unreachable pass routes in the prior art in which candidate points are set in all areas directly in front of an unmanned vehicle, thereby reducing the calculation amount for planning the pass route and improving the planning speed of the pass route.

It should be understood that the contents described in the summary portion above are intended to limit neither key or important features of the embodiments of the present application, nor the scope of the application. Other features of the present application will be readily understood from the following description.

DESCRIPTION OF EMBODIMENTS

The embodiments of the present application will be described in more detail below with reference to the accompanying drawings. Although some embodiments of the present application are shown in the accompanying drawings, it should be understood that the present application may be embodied in a variety of forms and should not be construed as limited to the embodiments set forth herein. Instead, these embodiments are provided for a more thorough and complete understanding of the present application. It should be understood that the accompanying drawings and embodiments of the present application are for illustrative purpose only and are not intended to limit the protection scope of the present application.

The terms "first", "second", "third", "fourth" and the like (if present) in the description, claims and accompanying drawings described above of the embodiments of the present application are used to distinguish similar objects and not necessarily used to describe a specific order or an order of priority. It should be understood that the data so used is interchangeable where appropriate so that the embodiments of the present application described herein can be implemented in an order other than those illustrated or described herein. Moreover, the terms "comprising" and "including" and any variations thereof are intended to cover a non-exclusive inclusion. For example, a process, method, system, product, or device that includes a series of steps or units is not necessarily limited to those steps or units that are clearly listed, but may include steps or units that are not clearly listed or that are inherent to such process, method, product or device.

Figure 1:
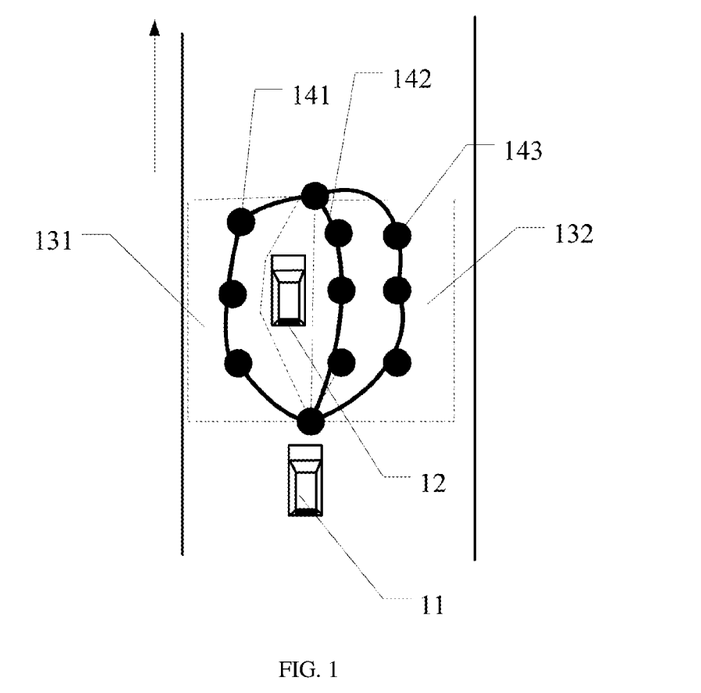
FIG. 1 is a schematic diagram of an application scenario of a pass route planning method according to an embodiment of the present application.

An application scenario of a pass route planning method according to an embodiment of the present application is introduced below. FIG. 1 is a diagram of an application scenario of a pass route planning method according to an embodiment of the present application. As shown in FIG. 1, the application scenario of the pass route planning method according to the embodiment of the present application is: a scenario in which an unmanned vehicle 11 travels on an expressway. A perceptual apparatus of the unmanned vehicle detects current road environment information in front of the vehicle, and the detected current road environment information may include: moving vehicle obstacle information and lane line information, and the like. Current moving vehicle obstacle is a moving vehicle 12, and the current road environment information in front of the vehicle is obtained from the perceptual apparatus, and a current passable area is determined according to the current road environment information. The current passable area determined in FIG. 1 includes two current passable areas 131 and 132. There is no moving vehicle obstacle in the current passable areas, and the unmanned vehicle can select an optimal route from the current passable areas for travelling. When the optimal route is selected from the current passable areas, pass candidate points are set in the current passable areas, and there are pass candidate points set outside the current passable areas, multiple pass routes are calculated from the pass candidate points, and multiple pass routes 141, 142, and 143 are determined, respectively. A current optimal passable route is selected from the multiple pass routes, and the current optimal passable route is 142. The pass route planning method according to the embodiment of the present application first determines the passable area, and then sets the pass candidate points in the passable area, and thus calculates the current optimal passable route according to the pass candidate points in the passable area, which can effectively reduce a calculation amount of unreachable pass routes in the prior art in which candidate points are set in all areas directly in front of the unmanned vehicle, thereby reducing a calculation amount for planning a pass route and improving a planning speed of the pass route.

The application scenario of the embodiment of the present application may also be an application scenario for planning a pass route on a medium and low speed highway, or another application scenario, which is not limited in the embodiment.

The embodiments of the present application will be specifically described below with reference to the accompanying drawings.

Embodiment 1

Figure 2:
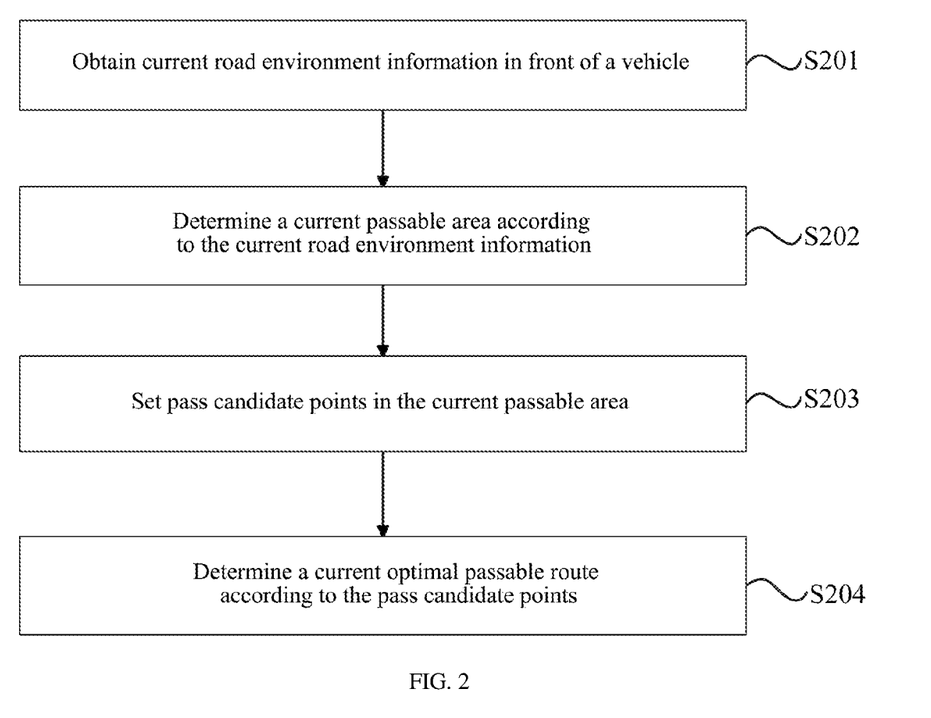
FIG. 2 is a flowchart of a pass route planning method according to Embodiment 1 of the present application.

FIG. 2 is a flowchart of a pass route planning method according to Embodiment 1 of the present application. As shown in FIG. 2, an execution subject of the embodiment of the present application is a pass route planning apparatus, and the pass route planning apparatus may be integrated in an electronic device, and the electronic device can be located in an unmanned vehicle. The pass route planning method according to the embodiment includes the following steps.

Step 201, obtaining current road environment information in front of a vehicle.

Specifically, in the embodiment, the unmanned vehicle is provided with a perceptual apparatus, and the perceptual apparatus may be a video capturing apparatus, a laser radar apparatus, and the like. The perceptual apparatus collects current road environment information in front of the vehicle, and the pass route planning apparatus obtains the current road environment information in front of the vehicle from the perceptual apparatus.

The current road environment information may include: obstacle information and lane line information.

The obstacle information may be moving vehicle obstacle information, rider information, and the like. The lane line information is information of various vehicle travel road lines.

Step 202, determining a current passable area according to the current road environment information.

Specifically, in the embodiment, a current passable area where an obstacle is excluded is determined according to the obstacle information and the lane line information in the current road environment information, and the current passable area is located within lane lines.

The current passable area is an area that the unmanned vehicle planning a pass route can pass.

Step 203, setting pass candidate points in the current passable area.

Specifically, in the embodiment, the pass candidate points may be set in the current passable area according to a candidate point setting policy. The setting the pass candidate points in the current passable area according to the candidate point setting policy may be: uniformly setting the pass candidate points in the current passable area, for example, an interval between the adjacent pass candidate points is set as a preset distance. The preset distance may be half a meter, 1 meter, and on the like. The setting the pass candidate points in the current passable area according to the candidate point setting policy may also be: densely setting the pass candidate points in an area near a moving vehicle obstacle in the current passable area, and sparsely setting the pass candidate points in an area away from the moving vehicle obstacle in the current passable area, so as to be able to obtain a better route when traveling towards the moving vehicle obstacle.

In the embodiment, the candidate point setting policy for setting the pass candidate points in the current passable area is not limited.

Step 204, determining a current optimal passable route according to the pass candidate points.

Specifically, in the embodiment, multiple passable routes from a current starting position to a current target position may be determined according to the pass candidate points, and each passable route is obtained by connecting multiple pass candidate nodes from the current starting position to the current target position, and the current optimal passable route is selected from the multiple passable routes. The selection of the current optimal passable route from the multiple passable routes may be based on safety consideration, or may be based on comfort consideration or based on fuel consumption consideration, which is not limited in the embodiment.

The pass route planning method according to the embodiment obtains current road environment information in front of a vehicle, determines a current passable area according to the current road environment information, sets pass candidate points in the current passable area, and determines a current optimal passable route according to the pass candidate points. Firstly, the passable area is determined, and then the pass candidate points are set in the passable area, and thus the current optimal passable route is calculated according to the pass candidate points in the passable area, which can effectively reduce a calculation amount of unreachable pass routes in the prior art in which candidate points are set in all areas directly in front of an unmanned vehicle, thereby reducing a calculation amount for planning the pass route and improving a planning speed of the pass route.

Embodiment 2

Figure 3:
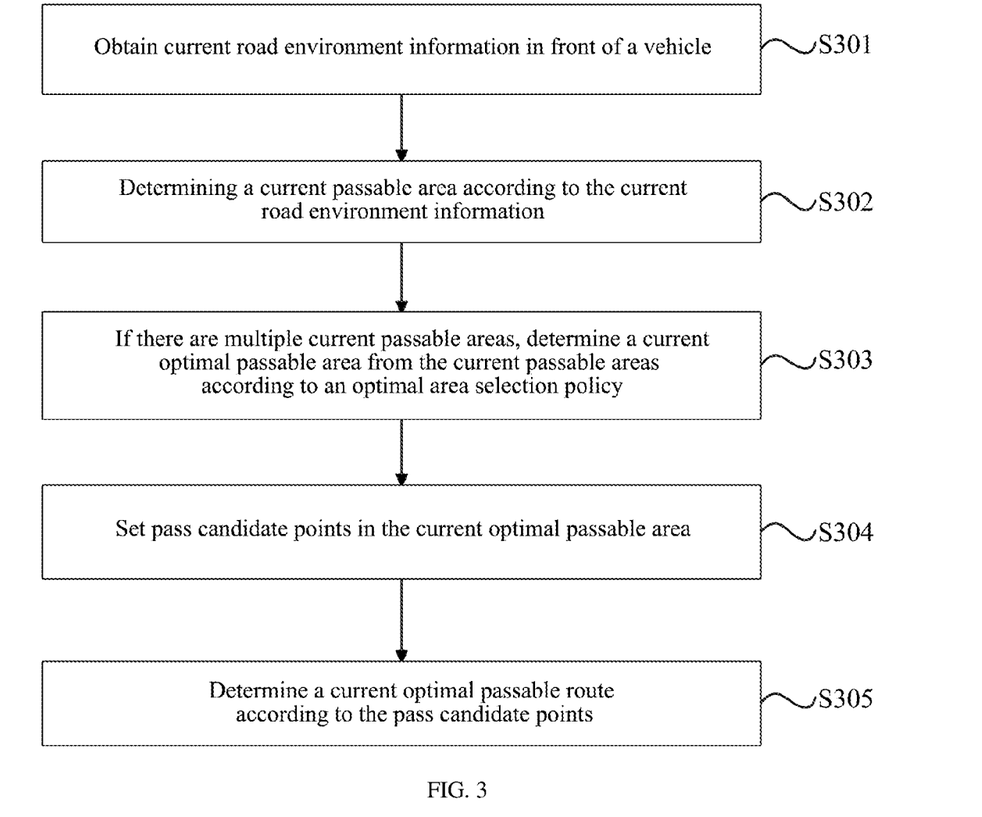
FIG. 3 is a flowchart of a pass route planning method according to Embodiment 2 of the present application.

FIG. 3 is a flowchart of a pass route planning method according to Embodiment 2 of the present application. As shown in FIG. 3, the pass route planning method according to the embodiment is based on the pass route planning method according to Embodiment I of the present application, and an application scenario is a scenario of expressway. Step 201 to step 204 are further refined, and a step of if there are multiple current passable areas, determining a current optimal passable area from the current passable areas according to an optimal area selection policy is further included, so that the pass route planning method according to the embodiment includes the following steps.

Step 301, obtaining current road environment information in front of a vehicle.

Further, in the embodiment, the current road environment information includes: moving vehicle obstacle information and lane line information.

Specifically, the application scenario of the pass route planning method according to the embodiment is a scenario of expressway, that is, obstacle information of the current road environment information in front of the vehicle obtained from a perceptual apparatus includes the moving vehicle obstacle information.

Step 302, determining a current passable area according to the current road environment information.

Figure 4:
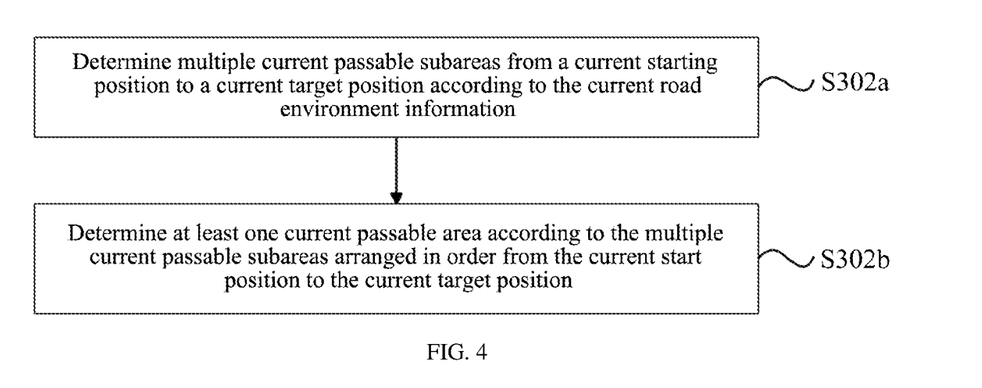
FIG. 4 is a flowchart of step 302 of the pass route planning method according to Embodiment 2 of the present application.

Further, in the embodiment, FIG. 4 is a flowchart of step 302 of the pass route planning method according to Embodiment 2 of the present application. As shown in FIG. 4, in the embodiment, step 302 includes the following steps.

Step 302a, determining multiple current passable subareas from a current starting position to a current target position according to the current road environment information.

Further, multiple current passable subareas where a moving vehicle obstacle is excluded are determined in an area from current starting position to current target position within lane lines according to the lane line information and the moving vehicle obstacle information in the current road environment information, and each current passable subarea may be formed by grids greater than or equal to an occupied area of the vehicle. The current passable subareas are arranged next to each other.

Step 302b, determining at least one current passable area according to the multiple current passable subareas arranged in order from the current start position to the current target position.

Further, in the embodiment, multiple current passable areas may be included within the lane lines from the current starting position to the current target position, and when each current passable area is determined, if multiple passable subareas are arranged at the same time from one passable subarea to the next passable subarea, each of the next passable subareas that is forked out separates a corresponding current passable area. Both current starting position and current target position of the multiple current passable areas are the same.

Step 303, if there are multiple current passable areas, determining a current optimal passable area from the current passable areas according to an optimal area selection policy.

Further, in the embodiment, the optimal area selection policy may be that a current passable area closest to a target average position is selected from the multiple current passable areas as the current optimal passable area, or a current passable area farthest from an edge of lane lines, that is, located closest to a center of a lane, is selected as the optimal passable area, or another optimal area selection policy, which is not limited in the embodiment.

Step 304, setting pass candidate points in the current optimal passable area.

Further, in the embodiment, in step 304, the setting pass candidate points in the current optimal passable area is specifically:

setting the pass candidate points in the current optimal passable area according to a candidate point setting policy.

The candidate point setting policy may be: uniformly setting the pass candidate points in the current optimal passable area, for example, an interval between the adjacent pass candidate points is set as a preset distance. The candidate point setting policy may also be: densely setting the pass candidate points in an area near the moving vehicle obstacle in the current optimal passable area, and sparsely setting the pass candidate points in an area away from the moving vehicle obstacle in the current optimal passable area.

In the embodiment, the setting the pass candidate points in the current optimal passable area according to a candidate point setting policy specifically includes:

firstly, setting the pass candidate points according to a first density in a first preset area near the moving vehicle obstacle in the current optimal passable area.

Specifically, in the embodiment, since the unmanned vehicle has a driving policy such as following behavior or overtaking behavior near the moving vehicle obstacle, the setting the pass candidate points according to the first density in the first preset area near the moving vehicle obstacle is densely setting the pass candidate points in a rear side preset area, left and right side preset areas and a front side preset area near the moving vehicle obstacle, and the degree of density is setting the pass candidate points according to the first density.

The first preset area near the moving vehicle obstacle includes: the rear side preset area, the left and right side preset areas, and the front side preset area near the moving vehicle obstacle.

Secondly, setting the pass candidate points according to a second density in a second preset area away from the moving vehicle obstacle in the current optimal passable area.

The second preset area may be an area other than the first preset area in the current optimal passable area.

Specifically, in the embodiment, the pass candidate points are sparsely set in the second preset area away from the moving vehicle obstacle in the current optimal passable area, and the degree of sparseness may be set according to the second density.

The first density is greater than the second density.

Step 305, determining a current optimal passable route according to the pass candidate points.

Figure 5:
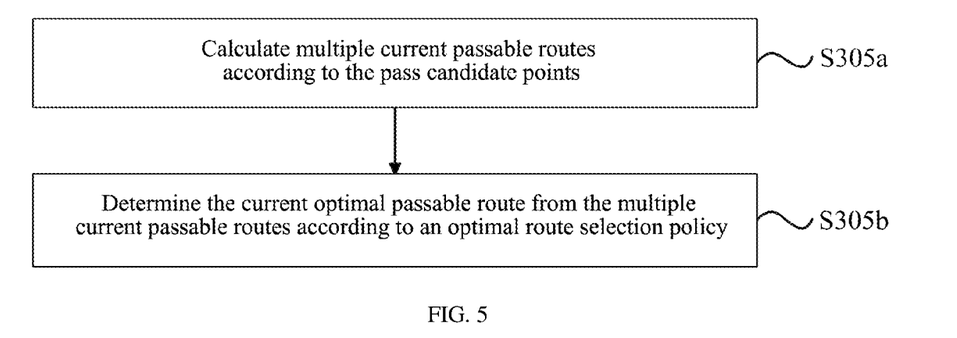
FIG. 5 is a flowchart of step 305 of the pass route planning method according to Embodiment 2 of the present application.

Further, FIG. 5 is a flowchart of step 305 of the pass route planning method according to Embodiment 2 of the present application. As shown in FIG. 5, in the embodiment, step 305 includes the following steps.

Step 305a, calculating multiple current passable routes according to the pass candidate points.

In the embodiment, the calculating multiple current passable routes according to the pass candidate points is specifically:

calculating the multiple current passable routes according to the pass candidate points using a route determining algorithm.

Specifically, in the embodiment, information of the pass candidate points is input into the route determining algorithm, and the route determining algorithm calculates the multiple current passable routes according to the information of the pass candidate points. Each current passable route includes multiple pass candidate points connected in front and rear.

The route determining algorithm may be a grid algorithm or an improved expectation-maximization (EM) algorithm, or another route determining algorithm, which is not limited in the embodiment.

Step 305b, determining the current optimal passable route from the multiple current passable routes according to an optimal route selection policy.

Figure 6:
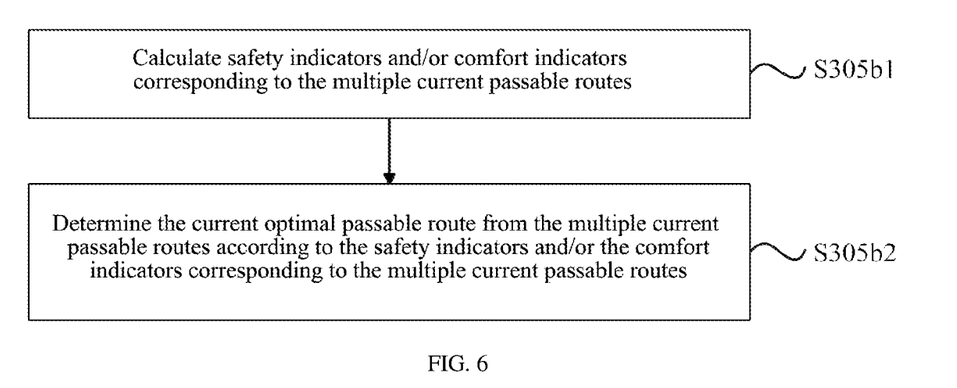
FIG. 6 is a flowchart of step 305*b* of the pass route planning method according to Embodiment 2 of the present application.

Further, FIG. 6 is a flowchart of step 305b of the pass route planning method according to Embodiment 2 of the present application. As shown in FIG. 6, in the embodiment, step 305b includes the following steps.

Step 305b1, calculating safety indicators and/or comfort indicators corresponding to the multiple current passable routes.

Specifically, in the embodiment, indicators that need to be referenced in the optimal route selection policy are first determined, and the indicators that need to be referenced may be safety indicators, or comfort indicators, or both safety indicators and comfort indicators. Then the safety indicator corresponding to each current passable route, or the comfort indicator corresponding to each current passable route, or the safety indicator and the comfort indicator corresponding to each passable route, are calculated.

In an embodiment, the safety indicator at least includes: a distance indicator of a current passable route with respect to both the moving vehicle obstacle and lane lines; and the comfort indicator at least includes: a curvature indicator of the current passable route.

If the safety indicator includes: the distance indicator of the current passable route with respect to the moving vehicle obstacle and the lane lines, and a distance between the current passable route and the moving vehicle obstacle is best within a corresponding safe distance range, and a distance between the current passable route and the lane lines is best within a corresponding safe distance range, the safety indicator is better. If the comfort indicator is the curvature indicator of the current passable route, the smoother the curvature indicator of the current passable route, the smaller a centrifugal force, and the better the comfort indicator.

Step 305b2, determining the current optimal passable route from the multiple current passable routes according to the safety indicators and/or the comfort indicators corresponding to the multiple current passable routes.

Further, in the embodiment, if the optimal route selection policy includes only the safety indicators, the current optimal passable route is determined from the multiple current passable routes according to the safety indicators corresponding to the multiple current passable routes. A current passable route with a best safety indicator is determined as the current optimal passable route.

If the optimal route selection policy includes only the comfort indicators, the current optimal passable route is determined from the multiple current passable routes according to the comfort indicators corresponding to the multiple current passable routes. A current passable route with a best comfort indicator is determined as the current optimal passable route.

If the optimal route selection policy includes both the safety indicators and the comfort indicators, the current optimal passable route is determined from the multiple current passable routes according to the safety indicators and the comfort indicators corresponding to the multiple current passable routes. When determining, values corresponding to the safety indicators and the comfort indicators may be weighted and summed to obtain total indicators, and the total indicators are compared to determine an optimal total indicator, and a current passable route corresponding to the optimal total indicator is determined as the current optimal passable route.

The pass route planning method according to the embodiment obtains current road environment information in front of a vehicle, determines a current passable area according to the current road environment information, if there are multiple current passable areas, determines a current optimal passable area from the current passable areas according to an optimal area selection policy, sets the pass candidate points in the current optimal passable area, and determines a current optimal passable route according to the pass candidate points. Compared to the pass route planning method according to Embodiment 1 of the present application, by determining the current optimal passable area from the current passable area after the current passable area is determined, setting pass candidate points in the optimal passable area, and calculating the current optimal pass route according to the pass candidate points, a range of setting the pass candidate points is further reduced, and unnecessary calculation of current pass routes is further reduced, thereby further reducing a calculation amount for planning the pass route and improving a planning speed of the pass route.

The pass route planning method according to the embodiment, when setting the pass candidate points in the current optimal passable area according to the candidate point setting policy, the pass candidate points are set according to a first density in a first preset area near the moving vehicle obstacle in the current optimal passable area; the pass candidate points are set according to a second density in a second preset area away from the moving vehicle obstacle in the current optimal passable area; where the first density is greater than the second density. It is possible to distinctively set the pass candidate points according to a driving policy of the unmanned vehicle, and it is possible to obtain a better route when traveling near the moving vehicle obstacle.

Embodiment 3

Figure 7:
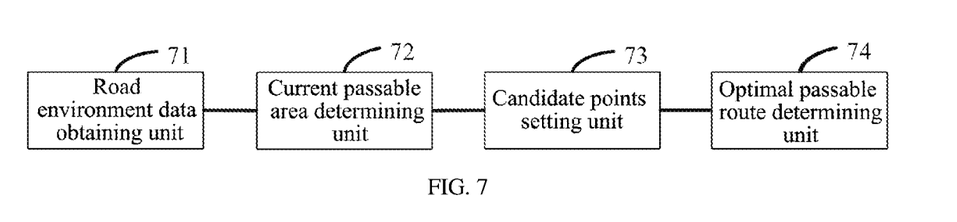
FIG. 7 is a schematic structural diagram of a pass route planning apparatus according to Embodiment 3 of the present application.

FIG. 7 is a schematic structural diagram of a pass route planning apparatus according to Embodiment 3 of the present application. As shown in FIG. 7, the pass route planning apparatus according to the embodiment includes: a road environment data obtaining unit 71, a current passable area determining unit 72, a candidate point setting unit 73 and an optimal passable route determining unit 74.

The road environment data obtaining unit 71 is configured to obtain current road environment information in front of a vehicle. The current passable area determining unit 72 is configured to determine a current passable area according to the current road environment information. The candidate point setting unit 73 is configured to set pass candidate points in the current passable area. The optimal passable route determining unit 74 is configured to determine a current optimal passable route according to the pass candidate points.

The pass route planning apparatus according to the embodiment may perform the technical solution of the method embodiment shown in FIG. 2, and the implementation principles and technical effects thereof are similar, and details are not described herein again.

Embodiment 4

Figure 8:
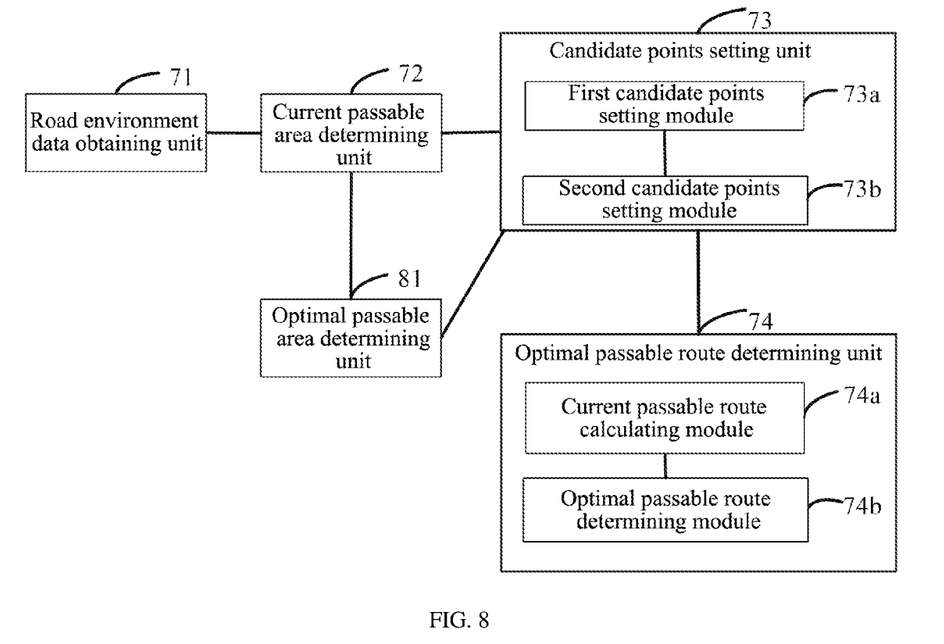
FIG. 8 is a schematic structural diagram of a pass route planning apparatus according to Embodiment 4 of the present application.

FIG. 8 is a schematic structural diagram of a pass route planning apparatus according to Embodiment 4 of the present application. As shown in FIG. 8, on the basis of the pass route planning apparatus according to Embodiment 3 of the present application, the pass route planning apparatus according to the embodiment further includes: an optimal passable area determining unit 81.

The optimal passable area determining unit 81 is configured to, if there are multiple current passable areas, determine a current optimal passable area from the current passable areas according to an optimal area selection policy. Correspondingly, the candidate point setting unit 73 is specifically configured to set the pass candidate points in the current optimal passable area.

Further, the current passable area determining unit 72 is specifically configured to determine multiple current passable subareas from a current starting position to a current target position according to the current road environment information; and determine at least one current passable area according to the multiple current passable subareas arranged in order from the current start position to the current target position.

Further, the candidate point setting unit 73 is specifically configured to set the pass candidate points in the current optimal passable area according to a candidate point setting policy.

The candidate point setting unit 73 specifically includes: a first candidate point setting module 73a and a second candidate point setting module 73b.

The current road environment information includes: moving vehicle obstacle information and lane line information. Correspondingly, the first candidate point setting module 73a is configured to set the pass candidate points according to a first density in a first preset area near a moving vehicle obstacle in the current optimal passable area. The second candidate point setting module 73b is configured to set the pass candidate points according to a second density in a second preset area away from the moving vehicle obstacle in the current optimal passable area. The first density is greater than the second density.

Further, the optimal passable route determining unit 74 specifically includes: a current passable route calculating module 74a and an optimal passable route determining module 74b.

The current passable route calculating module 74a is configured to calculate multiple current passable routes according to the pass candidate points. The optimal passable route determining module 74b is configured to determine the current optimal passable route from the multiple current passable routes according to an optimal route selection policy.

Further, the current passable route calculating module 74a is specifically configured to calculate the multiple current passable routes according to the pass candidate points using a route determining algorithm.

Further, the optimal passable route determining module 74b is specifically configured to calculate safety indicators and/or comfort indicators corresponding to the multiple current passable routes; and determine the current optimal passable route from the multiple current passable routes according to the safety indicators and/or the comfort indicators corresponding to the multiple current passable routes.

Each of the safety indicators at least includes: a distance indicator of a current passable route with respect to a moving vehicle obstacle and lane lines; and each of the comfort indicators at least includes: a curvature indicator of the current passable route.

The pass route planning apparatus according to the embodiment may perform the technical solutions of the method embodiments shown in FIG. 3 to FIG. 6, and the implementation principles and the technical effects thereof are similar, and details are not described herein again.

Embodiment 5

Figure 9:
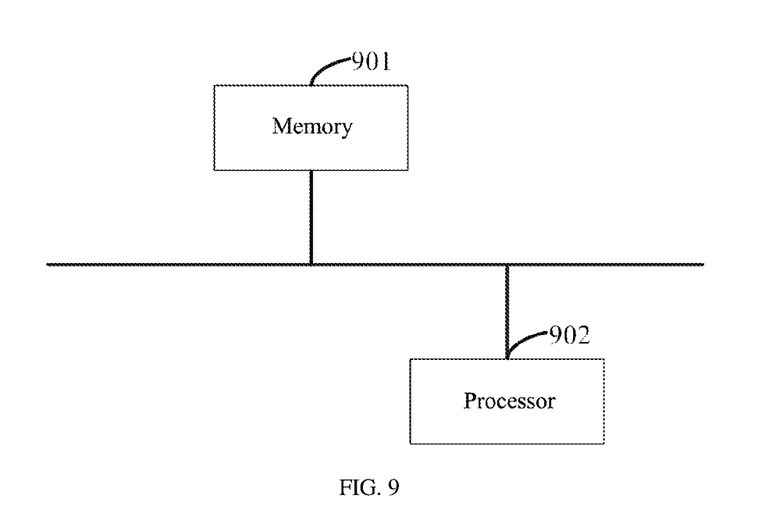
FIG. 9 is a schematic structural diagram of an electronic device according to Embodiment 5 of the present application.

FIG. 9 is a schematic structural diagram of an electronic device according to Embodiment 5 of the present application. As shown in FIG. 9, the electronic device according to the embodiment includes: a memory 901, a processor 902 and a computer program.

The computer program is stored in the memory 901 and configured to be executed by the processor 902 to implement the pass route planning method according to Embodiment 1 of the present application or the pass route planning method according to Embodiment 2 of the present application.

The related description can be understood by referring to the related descriptions corresponding to FIG. 1 to FIG. 6, and details are not described herein.

The electronic device provided by the embodiment includes: a memory, a processor and a computer program. The computer program is stored in the memory and configured to be executed by the processor to implement the pass route planning method according to Embodiment 1 of the present application or the pass route planning method according to Embodiment 2 of the present application. Firstly, the passable area is determined, and then the pass candidate points are set in the passable area, and thus the current optimal passable route is calculated according to the pass candidate points in the passable area, which can effectively reduce a calculation amount of unreachable pass routes in the prior art in which candidate points are set in all areas directly in front of an unmanned vehicle, thereby reducing a calculation amount for planning a pass route and improving a planning speed of the pass route.

Embodiment 6

Embodiment 6 of the present application provides a computer readable storage medium with a computer program stored thereon, and the computer program is executed by a processor to implement the pass route planning method according to Embodiment 1 of the present application or the pass route planning method according to Embodiment 2 of the present application.

The computer readable storage medium provided by the embodiment has a computer program stored thereon, and the computer program is executed by a processor to implement the pass route planning method according to Embodiment 1 of the present application or the pass route planning method according to Embodiment 2 of the present application. Firstly, the passable area is determined, and then the pass candidate points are set in the passable area, and thus the current optimal passable route is calculated according to the pass candidate points in the passable area, which can effectively reduce a calculation amount of unreachable pass routes in the prior art in which candidate points are set in all areas directly in front of an unmanned vehicle, thereby reducing a calculation amount for planning a pass route and improving a planning speed of the pass route.

In the several embodiments provided by the present application, it should be understood that the disclosed apparatus and method may be implemented in other manners. For example, the apparatus embodiments described above are merely illustrative. For example, the division of the module is only a logical function division, and there may be other division manners in actual implementation; for example, multiple modules or components may be combined or may be integrated into another system, or some features can be ignored or not be executed. In addition, the mutual coupling or direct coupling or communication connection shown or discussed may be an indirect coupling or communication connection through some interfaces, apparatuses or modules, and may be in an electrical, mechanical or other form.

The module described as a separate component may or may not be physically separated, and the component displayed as a module may or may not be a physical module, that is, may be located in one place, or may be distributed to multiple network modules. Some or all the modules may be selected as required to achieve the purpose of the solution of the embodiment.

In addition, each functional module in each embodiment of the present application may be integrated into one processing module, or each module may exist physically separately, or two or more modules may be integrated into one module. The above integrated module can be implemented in the form of hardware or in the form of hardware plus software functional modules.

The program codes for implementing the methods of the present application can be written in any combination of one or more programming languages. Such program codes may be provided to a general computer, a dedicated computer or a processor or controller of other programmable data processing apparatus, such that when the program codes are executed by the processor or controller, the functions/operations specified in the flowcharts and/or block diagrams are caused to be implemented. The program codes may be completely or partly executed on a machine, as a stand-alone software package, it is partly executed on a machine and partly executed on a remote machine, or entirely executed on a remote machine or server.

In the context of the present application, a machine readable medium can be a tangible medium that can contain or store a program for use by an instruction execution system, apparatus, or device, or for use in conjunction with the instruction execution system, apparatus, or device. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium may include electrical connection based on one or more wires, a portable computer disk, a hard disk, a random access memory (RAM), a read only memory (ROM), an erasable programmable read only memory (EPROM) or a flash memory, optical fiber, a compact disk read only memory (CD-ROM), an optical storage device, a magnetic storage device, or any suitable combination of the foregoing.

In addition, although the operations are depicted in a particular order, this should be understood that such operations are required to be performed in the shown specific order or in a sequential order, or that all illustrated operations are required to be performed to achieve desired results. Multitasking and parallel processing may be advantageous in certain circumstances. Likewise, although several specific implementation details are included in the above discussion, these should not be construed as limiting the scope of the present disclosure. Certain features that are described in the context of separate embodiment can also be implemented in combination in a single implementation. Conversely, various features that are described in the context of a single implementation can be implemented in multiple implementations, either individually or in any suitable sub-combination.

Although the subject has been described in language specific to structural features and/or methodological acts, it should be understood that the subject defined in the appended claims is not necessarily limited to the specific features or acts described above. Instead, the specific features and acts described above are merely exemplary forms for implementing the claims.

What is claimed is:

1. A pass route planning method for an unmanned driving vehicle, comprising:
   obtaining, by a pass route planning apparatus located in the unmanned driving vehicle, current road environment information in front of the unmanned driving vehicle;
   determining, by the pass route planning apparatus, a current passable area according to the current road environment information, the current passable area being an area where an obstacle is excluded;
   setting, by the pass route planning apparatus, pass candidate points in the current passable area;

determining, by the pass route planning apparatus, a current optimal passable route according to the pass candidate points; and enabling, by the pass route planning apparatus, the unmanned driving vehicle to travel along the current optimal passable route;

wherein the determining, by the pass route planning apparatus, a current passable area according to the current road environment information comprises:

determining, by the pass route planning apparatus, multiple current passable subareas from a current starting position to a current target position according to the current road environment information, wherein the current target position is in front of the obstacle, and each current passable subarea in the multiple current passable subareas is formed by grids greater than or equal to an occupied area of the unmanned driving vehicle;

determining, by the pass route planning apparatus, at least one current passable area according to the multiple current passable subareas arranged in order from the current start position to the current target position.

2. The method according to claim 1, wherein after the determining, by the pass route planning apparatus, a current passable area according to the current road environment information, the method further comprises:

if there are multiple current passable areas, determining, by the pass route planning apparatus, a current optimal passable area from the current passable areas according to an optimal area selection policy;

correspondingly, the setting, by the pass route planning apparatus, pass candidate points in the current passable area is:

setting, by the pass route planning apparatus, the pass candidate points in the current optimal passable area.

3. The method according to claim 1, wherein the setting, by the pass route planning apparatus, the pass candidate points in the current optimal passable area is:

setting, by the pass route planning apparatus, the pass candidate points in the current optimal passable area according to a candidate point setting policy.

4. The method according to claim 3, wherein the setting, by the pass route planning apparatus, the pass candidate points in the current optimal passable area according to a candidate point setting policy comprises:

setting, by the pass route planning apparatus, the pass candidate points according to a first density in a first preset area near the obstacle in the current optimal passable area.

5. The method according to claim 4, wherein the setting, by the pass route planning apparatus, the pass candidate points in the current optimal passable area according to a candidate point setting policy further comprises:

setting, by the pass route planning apparatus, the pass candidate points according to a second density in a second preset area away from the obstacle in the current optimal passable area, wherein the first density is greater than the second density.

6. The method according to claim 1, wherein the determining, by the pass route planning apparatus, a current optimal passable route according to the pass candidate points comprises:

calculating, by the pass route planning apparatus, multiple current passable routes according to the pass candidate points;

determining, by the pass route planning apparatus, the current optimal passable route from the multiple current passable routes according to an optimal route selection policy.

7. The method according to claim 6, wherein the calculating, by the pass route planning apparatus, multiple current passable routes according to the pass candidate points is:

calculating, by the pass route planning apparatus, the multiple current passable routes according to the pass candidate points using a route determining algorithm.

8. The method according to claim 6, wherein the determining, by the pass route planning apparatus, the current optimal passable route from the multiple current passable routes according to an optimal route selection policy comprises:

calculating, by the pass route planning apparatus, safety indicators, comfort indicators and/or fuel consumption corresponding to the multiple current passable routes;

determining, by the pass route planning apparatus, the current optimal passable route from the multiple current passable routes according to the safety indicators, the comfort indicators and/or fuel consumption corresponding to the multiple current passable routes.

9. The method according to claim 8, wherein each of the safety indicators at least comprises: a distance indicator of a current passable route with respect to the obstacle and lane lines; and each of the comfort indicators at least comprises: a curvature indicator of the current passable route.

10. The method according to claim 2, wherein the optimal area selection policy is that a current passable area closest to a target average position is selected from the multiple current passable areas as the current optimal passable area, or a current passable area farthest from an edge of lane lines, that is, located closest to a center of a lane, is selected from the multiple current passable areas as the current optimal passable area.

11. A pass route planning apparatus for an unmanned driving vehicle, comprising:

a memory, a processor, and a computer program stored on the memory and operable on the processor, wherein the processor, when running the computer program, is configured to:

obtain current road environment information in front of the unmanned driving vehicle;

determine a current passable area according to the current road environment information, the current passable area being an area where an obstacle is excluded;

set pass candidate points in the current passable area;

determine a current optimal passable route according to the pass candidate points; and enable the unmanned driving vehicle to travel along the current optimal passable route;

wherein the processor is further configured to:

determine multiple current passable subareas from a current starting position to a current target position according to the current road environment information, wherein the current target position is in front of the obstacle, and each current passable subarea in the multiple current passable subareas is formed by grids greater than or equal to an occupied area of the unmanned driving vehicle;

determine at least one current passable area according to the multiple current passable subareas arranged in order from the current start position to the current target position.

12. The pass route planning apparatus according to claim 11, wherein the processor is further configured to:

if there are multiple current passable areas, determine a current optimal passable area from the current passable areas according to an optimal area selection policy; and
set the pass candidate points in the current optimal passable area.

13. The pass route planning apparatus according to claim 11, wherein the processor is further configured to:
set the pass candidate points according to a first density in a first preset area near the obstacle in the current optimal passable area, and
set the pass candidate points according to a second density in a second preset area away from the obstacle in the current optimal passable area, wherein the first density is greater than the second density.

14. The pass route planning apparatus according to claim 11, wherein the processor is further configured to:
calculate multiple current passable routes according to the pass candidate points, and
determine the current optimal passable route from the multiple current passable routes according to an optimal route selection policy.

15. The pass route planning apparatus according to claim 14, wherein the processor is further configured to:
calculate safety indicators, comfort indicators and/or fuel consumption corresponding to the multiple current passable routes; and
determine the current optimal passable route from the multiple current passable routes according to the safety indicators, the comfort indicators and/or fuel consumption corresponding to the multiple current passable routes.

16. The pass route planning apparatus according to claim 15, wherein each of the safety indicators at least comprises: a distance indicator of a current passable route with respect to the obstacle and lane lines; and each of the comfort indicators at least comprises: a curvature indicator of the current passable route.

17. A nonvolatile memory with a computer program stored thereon, wherein the computer program is executed by a processor to:
obtain current road environment information in front of an unmanned driving vehicle;
determine a current passable area according to the current road environment information, the current passable area being an area where an obstacle is excluded;
set pass candidate points in the current passable area;
determine a current optimal passable route according to the pass candidate points; and
enable the unmanned driving vehicle to travel along the current optimal passable route;
wherein the computer program is further executed by the processor to:
determine multiple current passable subareas from a current starting position to a current target position according to the current road environment information, wherein the current target position is in front of the obstacle, and each current passable subarea in the multiple current passable subareas is formed by grids greater than or equal to an occupied area of the unmanned driving vehicle;
determine at least one current passable area according to the multiple current passable subareas arranged in order from the current start position to the current target position.

* * * * *